United States Patent [19]
Wardle et al.

[11] Patent Number: 5,469,713
[45] Date of Patent: Nov. 28, 1995

[54] LUBRICATION OF REFRIGERANT COMPRESSOR BEARINGS

[75] Inventors: Frank Wardle, Bodegraven; Bo Jacobson, Zeist; Henk Dolfsma, Tull en 'T Waal, all of Netherlands; Arthur Butterworth, La Crosse, Wis.

[73] Assignee: SKF USA, Inc., King of Prussia, Pa.

[21] Appl. No.: 184,861

[22] Filed: Jan. 21, 1994

[51] Int. Cl.⁶ .................................................. F25B 43/02
[52] U.S. Cl. ...................... 62/84; 62/193; 62/472
[58] Field of Search .............................. 62/472, 468, 469, 62/84, 192, 193

[56] References Cited

U.S. PATENT DOCUMENTS

| | | | |
|---|---|---|---|
| 3,280,576 | 10/1966 | Endress | 62/84 |
| 3,416,633 | 12/1968 | Swearingen | 62/472 X |
| 3,705,499 | 12/1972 | Mount et al. | 62/472 X |
| 4,066,869 | 1/1978 | Apaloo et al. | 62/472 X |
| 4,208,883 | 6/1980 | Stirling | 62/472 X |
| 4,241,591 | 12/1980 | Edwards | 62/402 |

*Primary Examiner*—Harry B. Tanner
*Attorney, Agent, or Firm*—Eugene E. Renz, Jr.

[57] ABSTRACT

A refrigerant device comprising at least one bearing disposed in a housing having a refrigerant flow path. The bearing is contacted with a lubricant charge of a small quantity of lubricant dissolved in liquid refrigerant. At least a portion of the liquid refrigerant proximate the bearing is vaporized to deposit lubricant on the bearing in sufficient quantity to provide for the lubrication thereof. The refrigerant may be vaporized by heat or by pressure drop, or by both. A sensor may be provided to monitor or control temperature and pressure conditions to insure that sufficient refrigerant is vaporized to form a lubricant liquid of at least about 75% lubricant by volume.

7 Claims, 5 Drawing Sheets

LUBRICATION OF REFRIGERANT COMPRESSOR BEARINGS

FIELD OF THE INVENTION

The present invention relates to a device, system and method for lubricating bearings in refrigerant compressors. More particularly, the present invention relates to a device, system and method in which a lubricant which has been dissolved in a liquid refrigerant is deposited on a bearing in sufficient quantity to provide for the lubrication thereof by vaporizing the liquid refrigerant at a point proximate the bearing to be lubricated.

BACKGROUND OF THE INVENTION

At the present time, most refrigeration systems utilize two partially miscible fluids; a refrigerant for heat transfer, and a lubricant for lubricating machine elements in the compressor, such as bearings and the like. The lubricant is necessary because refrigerants typically do not have adequate viscosity or lubricity for lubrication purposes. Because it is impractical to completely seal the two fluids from each other within the compressor, refrigeration systems are designed to manage the degree and locations where the mixing of these two fluids can occur. Compressors typically have a separate sump, pumping means, and distribution system for the lubricating oil, all isolated, but not sealed from the refrigerant. Pressure, temperature and mechanical separation means are employed to maintain a sufficiently oil rich mixture in the sump for reliable lubrication, typically no more than 20% refrigerant by weight. Refrigeration systems are also designed to limit the amount of oil discharged into the heat transfer devices, such as the evaporator, to avoid fouling and associated loss of system efficiency. Solubility characteristics between the fluids are tailored to minimize the amount of dissolved refrigerant in the oil sump, yet provide sufficient solubility in the evaporator, condenser, and interconnecting piping to assure oil leaving the compressor returns via entrainment in the circulating refrigerant.

The need to maintain an oil rich fluid in the sump, and limit the build up of oil in the evaporator, over the wide range of operating conditions common in refrigeration systems, usually necessitates complex and costly control systems and fluid separation features. Loss of control of the two fluids during extreme system operating conditions is a common cause of compressor failures, particularly compressor bearing failures, due to excessive refrigerant buildup in the sump. For these reasons, efforts have been directed to elimination of the need for oil separation, and to use the refrigerant rich lubricating fluids naturally residing in the evaporator or condenser for lubrication purposes.

A typical refrigeration system includes a compressor, condenser, expansion valve, and evaporator. Compressed refrigerant rich gas typically containing less than 2% oil is discharged from the compressor into a condenser where heat rejection transforms the refrigerant into a liquid. The mixture then passes through an expansion valve into the evaporator, where absorbed heat transforms the liquid mixture back into a gaseous refrigerant and liquid oil. As the mixture is discharged from the compressor, the oil is mechanically separated into a sump and the refrigerant is channeled into the compression process. In the specific case of oil flooded screw compressors, the mixture of oil and refrigerant discharged from the compressor is passed through an oil separator, where droplets containing 80% oil/20% refrigerant are collected for lubrication and oil sealing purposes.

Various efforts have been reported in the prior art to use oil and refrigerant mixtures as part of a lubrication system. Zimmern et al. U.S. Pat. No. 4,589,826 proposes a method of lubricating bearings in a compressor in which a refrigerant gas loaded with oil in the form of a mist is delivered to the bearings. This system requires a two phase system of gaseous refrigerant and oil droplets, and requires equipment to mix a known quantity of oil in a refrigerant gas.

The parent application of Zimmern et al., Noda et al. U.S. Pat. No. 4,553,399 discloses transferring a liquid refrigerant having oil dissolved therein to a casing of the compressor motor to vaporize the refrigerant, to form a two phase mixture with oil droplets in a gas mixture. The two phase mixture is then transferred to the bearings or other parts needing lubrication. In an alternative embodiment, the oil itself is transferred to the bearings after the gaseous refrigerant has been removed by vaporization using the heat of the motor. In both Noda et al. and Zimmern et al., attempts are made to lubricate bearings with gaseous refrigerants and droplets of lubricating oil, typically in concentrations of less than 2% or 3% by volume of oil.

One of the earliest designs for refrigeration machines having lubrication is disclosed in Stair U.S. Pat. No. 1,195,162. In the Stair patent, the lubricant is separated from the refrigerant by centrifugal force, one of many means of separation of oil from refrigerant that may be used.

Finally, two patents to Shaw, U.S. Pat. Nos. 4,375,156 and 4,439,121, disclose transfer of oil in a mist form, representing a two phase mixture of oil mist in gaseous refrigerant.

Accordingly, it is an object of this invention to provide an improved device, system and method for lubricating bearings and the like in refrigerant devices such as refrigerant compressors.

Another object of the present invention is to provide a device, system and method for using the oil contained in liquid refrigerant to lubricate bearings utilizing the heat generated by the bearing as the refrigerant vaporizing means and the like which in accordance with the preferred embodiment of the invention without use of expensive and complicated separation devices.

Other objects will appear hereinafter.

SUMMARY OF THE INVENTION

It has now been found that the above and other objects of the present invention may be accomplished in the following manner. Specifically, an improved lubrication device, system and method of its use has been invented. The invention provides for lubrication of at least one bearing in a flow path defined for a refrigerant/oil mixture such that the bearing is in a portion of the flow path. A fluid comprising a small quantity of oil dissolved in liquid refrigerant is carried through that portion of the flow path in which the bearing is disposed at a slow flow rate. Means are provided for vaporizing at least a portion of the liquid refrigerant at a location proximate the bearing to thereby release and deposit oil on the bearing in sufficient quantity to provide for the lubrication thereof. The oil is deposited by control of flow rate, heat and pressure drop at the bearing being lubricated. The term oil, as used herein, is intended to include natural and synthetic oils and other lubricants which are compatible with refrigerants used devices of the type described herein.

This invention provides a means of reliably lubricating rolling bearings in refrigerant compressors with refrigerant/oil mixtures which would normally have inadequate viscosity for such purposes. It has been discovered that, generally speaking, mixtures containing less than about 75% oil by weight can not sustain an oil film in rolling element bearings and therefore are unsuitable for lubrication purposes. In conflict with this requirement is the need to restrict oil concentration to 5% or less in the heat exchangers of a refrigeration system. The presence of oil in a heat exchanger negatively affects heat transfer and overall system efficiency. This invention provides a means for using a refrigerant rich mixture communicated from either an evaporator or condenser, to lubricate rolling element bearings by a process which concentrates the oil to a level suitable for the lubrication of such bearings. The concentration of oil is achieved by movement of the mixture into the two phase region of its pressure-enthalpy region to release an oil rich fluid for lubrication purposes on the bearing.

The success of the present invention may be accomplished in two ways. In one, the mixture is "flashed" from a high pressure condenser, rapidly dropping the pressure such as by metering it through a flow restricting orifice, thereby vaporizing refrigerant and releasing an oil rich fluid for lubrication purposes. In the other way, starting with low pressure liquid from an evaporator, the addition of heat has the same affect.

Bearing frictional heat plays a significant role in the enrichment process if flow rates are limited to the low levels typical of spot or mist lubrication methods (centiliters rather than liters per minute). At such low flow rates, bearing frictional heat, or bearing frictional heat combined with reduction of pressure, is sufficient to evaporate the refrigerant. Liquid refrigerant buildup in the bearing cavity should be limited to facilitate efficient vaporization and thereby concentration of oil.

The principal advantage of this invention is that the use of lubricating fluids naturally residing in either a low pressure evaporator or a high pressure condenser avoids the need for expensive and complicated mechanical oil separators, and avoids the need for a separate oil sump and associated sealing elements. This is particularly true in screw compressors using liquid refrigerant injection instead of oil injection to cool and seal the compression process since an oil separator would only be needed for bearing lubrication. Another advantage is that significantly reduced bearing friction is achieved due to low oil flow which may be as low as that used in spot or mist lubrication.

The invention requires that temperature, pressure and flow rate for the mixture be controlled to accomplish the vaporization of refrigerant from the mixture and the deposition of the remaining oil on the bearing. Proper control of these variables will insure good lubrication in accordance with the invention. In the preferred embodiment of the invention, bearing frictional heat alone or bearing frictional heat in combination with a pressure drop is used to vaporize refrigerant and deposit oil on the bearing.

The volume of oil dissolved in the liquid refrigerant will be small, typically in the range of 0.5% to about 5.0% by weight. Preferably the concentration of oil in the liquid refrigerant in contact with the bearing should be at least 75% oil, based on the total weight of liquid.

The invention may also be employed in more sophisticated designs, such as where pressure, temperature and flow sensors, and heaters are utilized at the location of the bearing to monitor and control the vaporization of refrigerant to enrich the oil concentration to 75% or more.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE INVENTION

Figure 1:
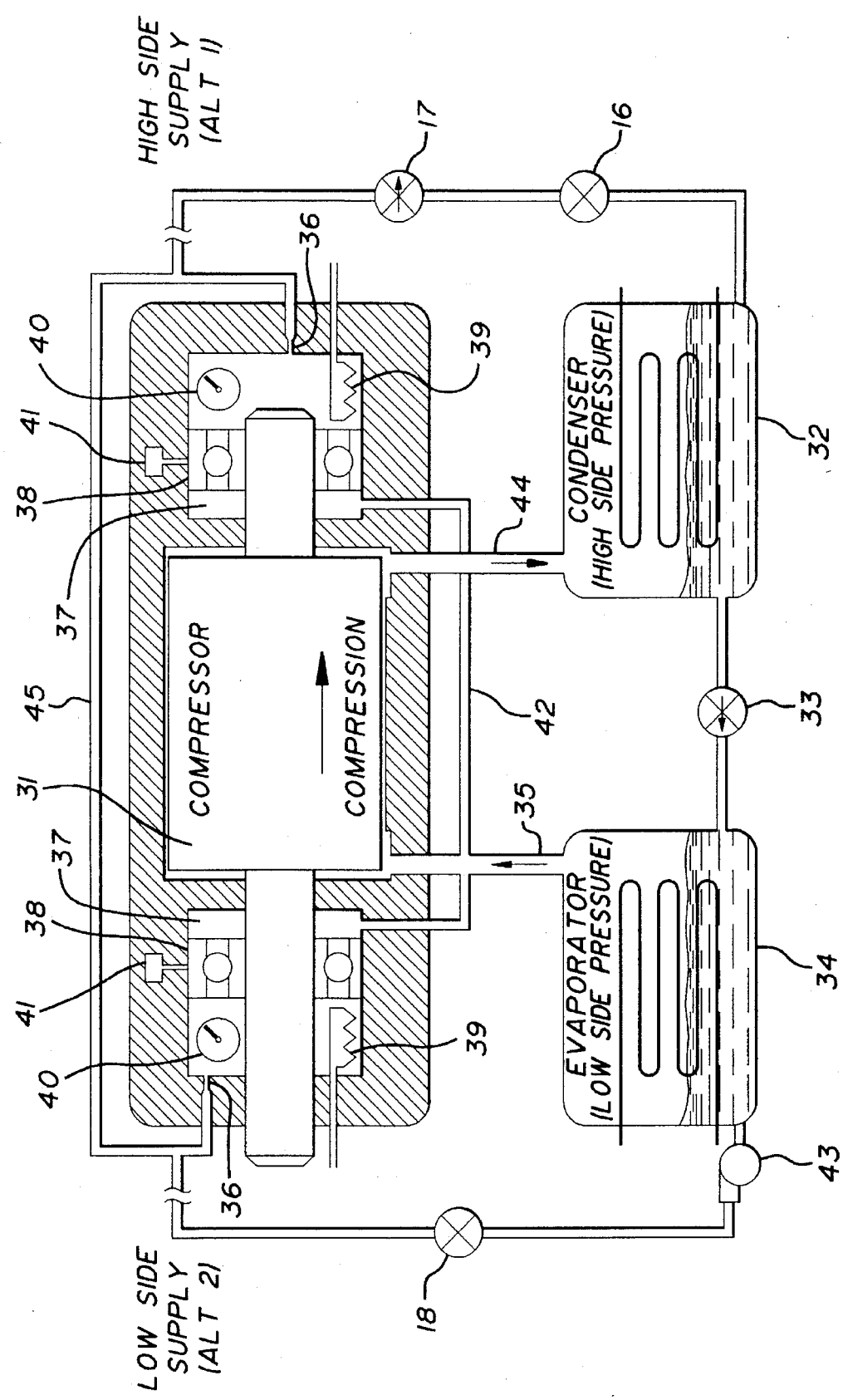
FIG. 1 is a schematic view of a typical refrigeration system employing the concepts of the preferred embodiment of this invention.

FIG. 1 shows a typical refrigeration system, consisting of a compressor 31, a condenser 32, an expansion valve 33, an evaporator 34, and the associated interconnecting piping. Refrigerant/oil mixtures typically reside in liquid form in both the evaporator and the condenser. Typical evaporator conditions in R134a: 45 psia and −1° C. Typical condenser conditions: 160 psia and 100° C. Systems are usually designed such that the fluid returning to the compressor through suction line 35 consists of vaporized refrigerant which may or may not contain droplets of oil. In the case of flooded type evaporators commonly used with centrifugal compressors, oil tends to remain in solution in the evaporator rather than return in droplet form. In direct expansion evaporators, commonly used with reciprocating, screw, and scroll compressors, oil droplets return to the compressor entrained in the vaporized refrigerant, and circulate through the entire system. A typical flooded evaporator 34 contains a bath of liquid refrigerant, through which a second liquid flows isolated within passage ways. In a direct expansion evaporator, the refrigerant flows through the passage ways, isolated from and surrounded by the second fluid. In both cases heat transfer from the second fluid vaporizes liquid refrigerant.

Figure 2:
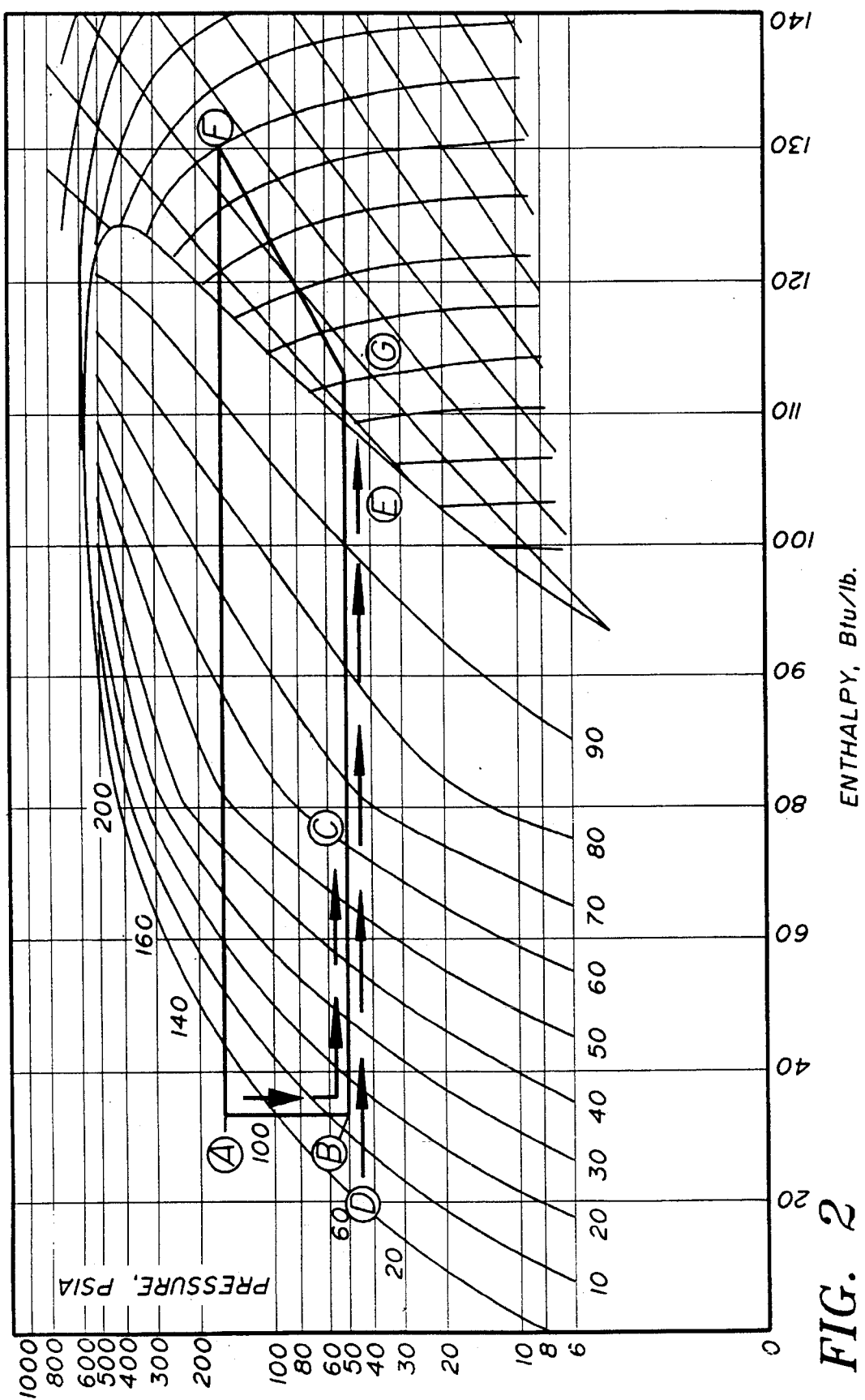
FIG. 2 is a pressure-enthalpy diagram for a particular refrigerant, illustrating a typical refrigeration cycle.

FIG. 2 illustrates the process on a standard pressure—enthalpy diagram for refrigerant R-134a, describing a cycle that is typical for most refrigerant systems. Refrigerant vapor is compressed from state point G to F in the compressor. Heat is rejected in the condenser from F to A, condensing the vapor back into a liquid phase. Reexpansion A to B occurs as the fluid passes through a metering device which lowers the pressure from the high pressure in the condenser to the low pressure in the evaporator. In this process most of the fluid remains liquid at state point D, and a portion vaporizes to a gas at state point E. Heat absorbed in the evaporator vaporizes the remaining refrigerant to state point E. To assure that no incompressible fluids return to the compressor, the vaporized gas is often super heated to state point G.

An oil film separating a rolling element from a raceway is essential for reliable lubrication of rolling element bearings. In laboratory investigations, the presence of such an oil film was established using lift off speed as a criteria. The formation of an oil film is highly dependent on lubricant viscosity and bearing rotational speed; higher viscosity and speed improves film formation and thickness. Lift off is defined as the minimum speed required to prevent metal to metal contact between raceway and rolling element. Low lift off speed is a criteria for efficient film formation. From measurements of lift off speed as a function of bearing cavity pressure and outer ring temperature, it was possible to develop the map of lift off speed as a function these variables shown in FIG. 3.

Figure 3:
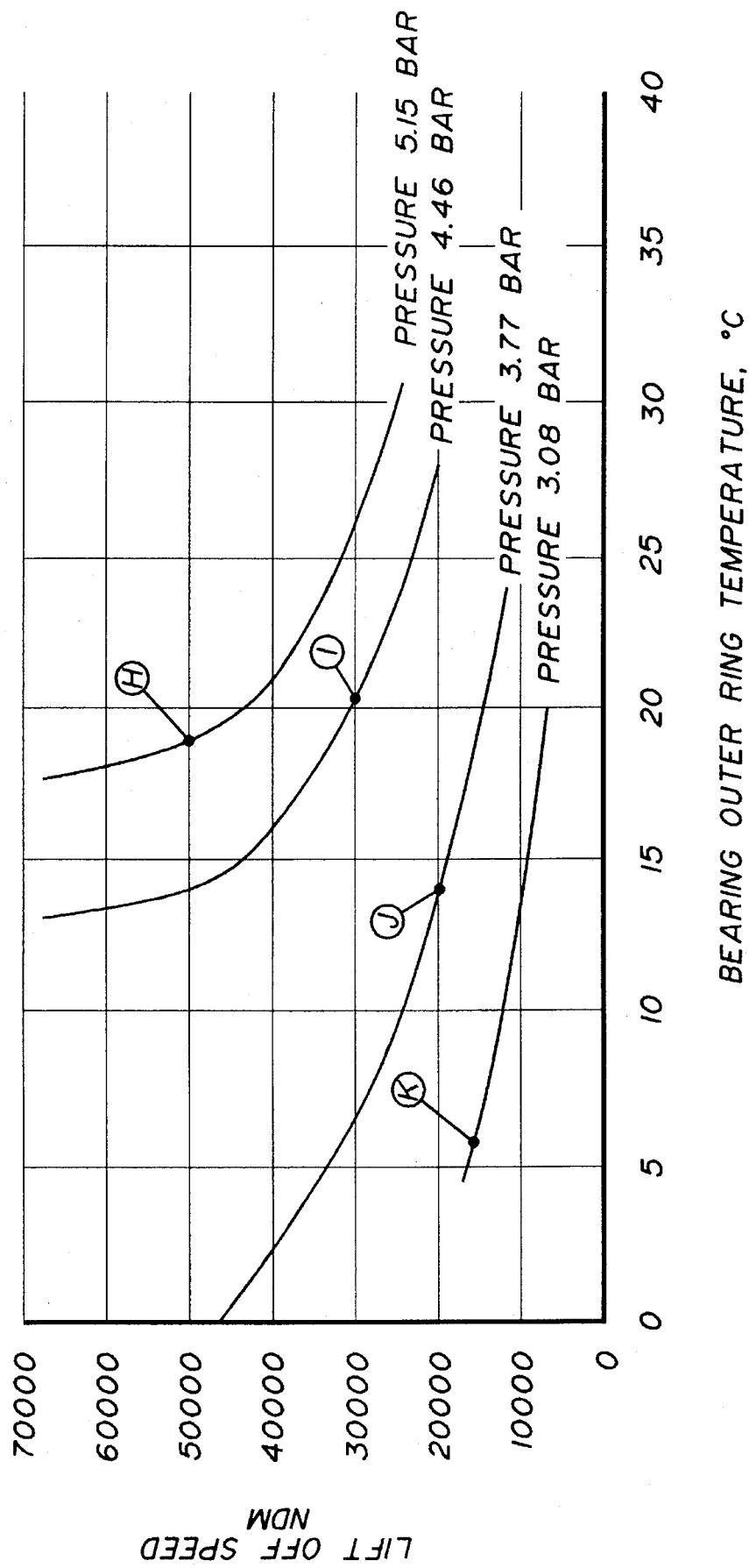
FIG. 3 is a schematic illustration of bearing lift-off speed as a function of variations in temperature and pressure.
Figure 4:
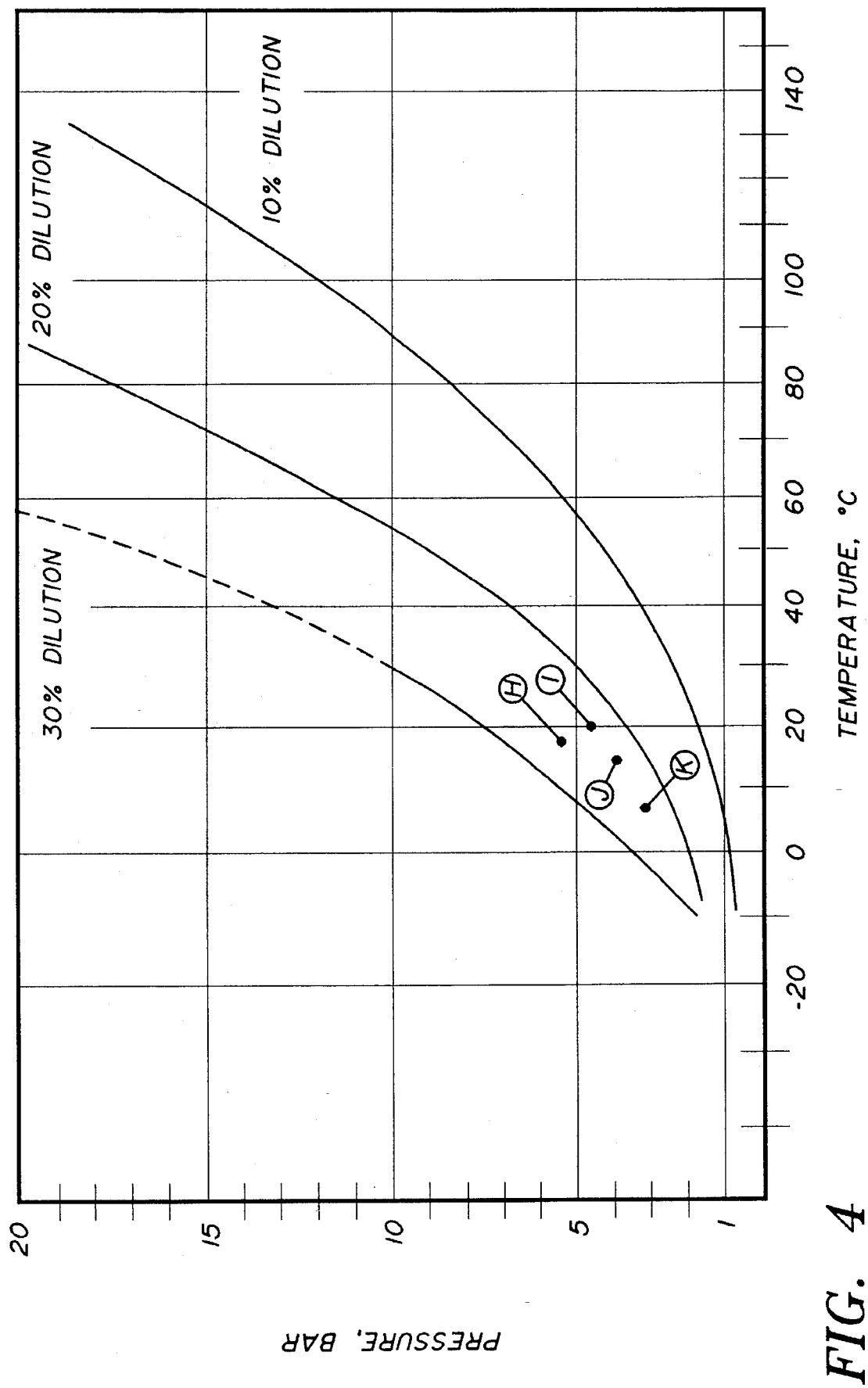
FIG. 4 illustrates the equilibrium relationship of refrigerant/oil mixture for various pressures and temperatures.
Figure 5:
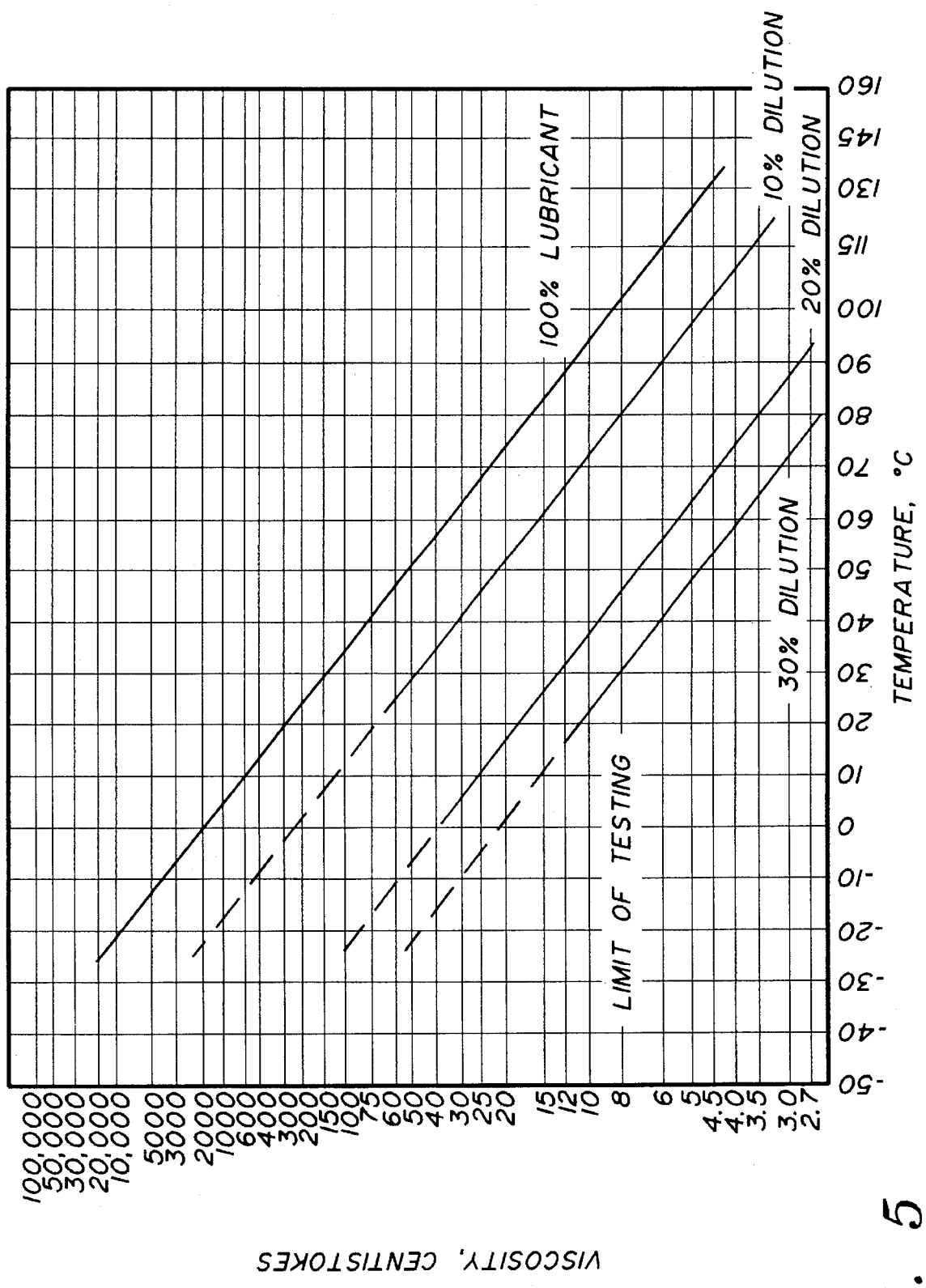
FIG. 5 shows the influence of mixture composition and temperature on viscosity.

For an understanding of FIG. 3, it is necessary to consider first how pressure and temperature influence composition of the refrigerant/oil mixture, FIG. 4, and secondly how mixture composition and temperature influence viscosity, FIG. 5. To achieve low lift off speeds, the lubricant must have sufficiently high viscosity. In the two phase region of the pressure—enthalpy chart, FIG. 2, any mixture of oil and refrigerant will be in equilibrium with a vapor phase of the refrigerant, so that the equilibrium concentration of refrigerant in oil is highly dependent on pressure and temperature. FIG. 2 is for refrigerant only, but may be used to describe approximately the behavior of refrigerant rich solutions of both oil and refrigerant. FIG. 4 is complimentary to FIG. 2 and shows the dependence of mixture composition upon pressure and temperature for the oil rich fluids necessary to provide good bearing lubrication. FIG. 5 shows the influence of mixture composition and temperature on viscosity.

The experimental observations shown in FIG. 3 can be explained by considering specific combinations of bearing outer ring temperature, and lift off speed from FIG. 3, in relationship with equilibrium concentrations in FIG. 4. In the experiments, a ball bearing of size 6204 was used. In order to make the experimental results independent of bearing size, the NDM speed concept is useful. This is done by multiplying the bearing mean diameter DM with the bearing speed N. The mean diameter for bearing size 6204 is 33.5 mm, therefore at 1000 rpm the NDM speed is 33,500. The experimental data is valid for polyolester oil and R134a refrigerant. The data in the table below are taken from FIG. 3 and FIG. 4.

| POINT | H | I | J | K |
|---|---|---|---|---|
| Lift off speed NDM (FIG. 3) | 50000 | 30000 | 20000 | 15000 |
| Outer ring temp °C. (FIG. 3) | 19.0 | 20.0 | 14.0 | 5.5 |
| Pressure, bar (FIG. 4) | 5.15 | 4.46 | 3.77 | 3.08 |
| Oil Dilution % (FIG. 4) | 27% | 23% | 25% | 25% |

These results show that bearing oil film formation was achieved at a refrigerant dilution of approximately 25%, or in other words, 75% concentration of oil.

Turning back to FIG. 1, an embodiment of the invention, Alt 1, is shown, applicable to systems with oil present in the condenser, such as screw compressor driven systems. The refrigerant rich mixture from the condenser, state point A, is flashed through orifice 36 into bearing cavity 37 and state point B. This process alone releases some oil rich fluid for lubrication purposes. Frictional heat from bearing 38 vaporizes additional refrigerant and releases additional oil. Total flow and amount of fluid in the bearing cavity must be kept low enough such that bearing frictional heat, and heat from adjacent components is sufficient to vaporize liquid refrigerant to concentrate the oil to 75% or more. For systems with large fluctuations in operating conditions or shaft speed, an auxiliary heat source 39 and flow control devices 16 and 17 can be added to assure adequate vaporization at all operating conditions. Control of flow is achieved with flow meter 16 and flow control valve 17. Auxiliary heat input could be controlled using pressure sensor 40 and temperature sensor 41 to assure conditions favorable for vaporization and deposition of oil on the bearings. Bearing cavity 37 is vented back to the suction line via line 42. In this embodiment naturally occurring system pressure differentials can be used to circulate the lubricant, avoiding the need for a lubricant pump.

An alternative embodiment, Alt 2, of the present invention is also shows in FIG. 1. In Alt 2, oil resides in the evaporator and does not pass through the compressor into the condenser, such as a flooded evaporator combined with a centrifugal compressor. In this case, all of the oil is mixed with liquid refrigerant at state point D in the evaporator. Pump 43 delivers the refrigerant rich mixture through flow meter 18 and orifice 36 into bearing cavity 37. In this case, pump speed and flow rate can be controlled by flow meter 18. The only function of orifice 36 is to atomize the mixture for better distribution within the bearing cavity. Bearing frictional heat, heat from adjacent components, and an auxiliary heat source 39 are combined to vaporize liquid refrigerant; from state point D to E. This alternative requires a greater amount of heat for vaporization because of starting from D rather than B as in the high side alternative above. Pressure and temperature sensors 40 and 41 can be employed for control purposes as described above.

Line 45 is provided to transport lubricant to multiple bearings of the compressor 31 regardless of which alternative source, condenser 32 or evaporator 34, is used.

In summary, the present invention provides for an improved lubrication device, system and method, where a small quantity of a refrigerant/oil mixture is introduced to the region proximate a bearing under flow rate, temperature and pressure conditions which vaporizes the refrigerant and deposit a lubricant containing at least 75% oil by volume on the bearing(s). The heat generated by the bearing(s) provides the refrigerant vaporizing means either alone or in combination with auxiliary heating means or pressure control means depending on the compressor system configuration.

Other modifications and embodiments will become apparent to those skilled in the art upon reading the above disclosure.

Having thus described the invention, what is claimed is:

1. A method for lubricating a bearing in a refrigerant device, comprising the steps of:

providing a refrigerant flow path with said bearing being disposed in a portion of said flow path;

circulating a liquid refrigerant in said portion of said flow path, said liquid refrigerant containing a lubricant therein which is miscible with said liquid refrigerant, said lubricant ranging from about 0.5% to about 5.0% by weight of the weight of said liquid refrigerant; and vaporizing at least a portion of said liquid refrigerant proximate said bearing solely by bearing friction heat to deposit said lubricant on said bearing to produce a concentration of lubrication in said liquid refrigerant of at least 75% lubricant, based on the total weight of liquid deposited on said bearing.

2. The method of claim 1, including the step of reducing the pressure of said liquid refrigerant from a first pressure above the vaporization pressure of said refrigerant to a second pressure below the vaporization pressure of said refrigerant to thereby deposit said lubricant.

3. The method of claim 1, including the step of heating said liquid refrigerant at a substantially constant temperature.

4. A refrigerant system in which refrigerant containing a lubricant is cycled through a standard pressure-enthalpy cycle comprising:

a compressor mounted on bearings and an evaporator;

a refrigerant flow path in said system having at least one bearing in a portion of said refrigerant flow path;

a mixture of a liquid refrigerant and a lubricant, said lubricant ranging from about 0.5% to about 5.0% by weight of the weight of said liquid refrigerant in said mixture; and means for vaporizing at least a portion of said liquid refrigerant proximate said bearing solely by bearing friction to deposit said lubricant on said bearing to produce a concentration of lubricant in said liquid refrigerant of at least 75%, based on the total weight of liquid deposited on said bearing.

5. A system as claimed in claim 4 including monitoring means for measuring and controlling temperature and pressure conditions at said vaporizing means.

6. A refrigerant device comprising:

housing;

at least one rotatable member journaled in at least one bearing in said housing;

an impingement means defining a flow path in said housing for a refrigerant having a lubricant dissolved therein ranging from about 0.5% to about 5.0% by weight of the liquid refrigerant;

vaporizing means for vaporizing at least a portion of said liquid refrigerant proximate said bearing solely by bearing friction to deposit said lubricant on said bearing to, produce a concentration of lubrication in said liquid refrigerant of at least 75% lubricant based on the total weight of the liquid deposited on said bearing.

7. The device of claim 6, wherein said vaporizing means includes means for reducing the pressure of said refrigerant from a first pressure above the vaporization pressure of said refrigerant to a second pressure below the vaporization pressure of said refrigerant to thereby deposit said lubricant.

* * * * *